(12) United States Patent
Kale et al.

(10) Patent No.: US 11,301,132 B2
(45) Date of Patent: Apr. 12, 2022

(54) SCHEDULING MEDIA MANAGEMENT OPERATIONS BASED ON PROVIDED HOST SYSTEM USAGE REQUIREMENTS

(71) Applicant: MICRON TECHNOLOGY, INC., Boise, ID (US)

(72) Inventors: Poorna Kale, Folsom, CA (US); Ashok Sahoo, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 169 days.

(21) Appl. No.: 16/557,200

(22) Filed: Aug. 30, 2019

(65) Prior Publication Data

US 2021/0064237 A1    Mar. 4, 2021

(51) Int. Cl.
*G06F 3/06* (2006.01)

(52) U.S. Cl.
CPC .......... *G06F 3/0604* (2013.01); *G06F 3/0655* (2013.01); *G06F 3/0679* (2013.01)

(58) Field of Classification Search
CPC .... G06F 3/0604; G06F 3/0655; G06F 3/0679; G06F 9/4881
See application file for complete search history.

(56) References Cited

U.S. PATENT DOCUMENTS

| 6,157,991 | A | 12/2000 | Arnon | |
|---|---|---|---|---|
| 6,173,339 | B1 * | 1/2001 | Yorimitsu | G06F 11/0757 710/260 |
| 2013/0042095 | A1 * | 2/2013 | Jung | G06F 9/24 713/2 |
| 2013/0282960 | A1 * | 10/2013 | Kannappan | G06F 12/0246 711/103 |
| 2017/0031816 | A1 * | 2/2017 | Lee | G06F 3/0659 |
| 2018/0032281 | A1 * | 2/2018 | Gulati | G06F 13/1673 |
| 2019/0286219 | A1 * | 9/2019 | Anazawa | G06F 3/0679 |
| 2019/0317901 | A1 * | 10/2019 | Kachare | G06F 12/1009 |
| 2020/0089428 | A1 * | 3/2020 | Sunata | G06F 3/0652 |
| 2021/0011630 | A1 * | 1/2021 | Zhu | G11C 11/5642 |

FOREIGN PATENT DOCUMENTS

WO    2017075073 A1    5/2017

* cited by examiner

*Primary Examiner* — Tracy C Chan
(74) *Attorney, Agent, or Firm* — Lowenstein Sandler LLP

(57) ABSTRACT

One or more usage parameter values are received from a host system. The one or more parameter values correspond to one or more operations performed at the memory subsystem. Based on the one or more usage parameter values, a first expected time period is determined during which a first set of subsequent host data will be received from the host system and a second expected time period is determined during which a second set of subsequent host data will be received from the host system. A media management operation is scheduled to be performed between the first expected time period and the second expected time period.

20 Claims, 5 Drawing Sheets

---

Receive, from a host system, one or more usage parameter values, where the one or more usage parameter values correspond to one or more operations performed at a memory component 310

Determine, based on the one or more usage parameter values, a rate at which host data is to be written to the memory component 320

Determine, based on the rate at which the host data is to be written, an idle time period, where host data is not expected to be received from the host system during the idle time period 330

Scheduling, based on the rate at which the host data is to be written, a media management operation to be performed during the idle time period 340

Receive, from a host system, one or more usage parameter values, where the one or more usage parameter values correspond to one or more operations performed at a memory sub-system 210

Determine, based on the one or more usage parameter values, a first expected time period during which a first set of host data will be received from the host system and a second expected time period during which a second set of host data will be received from the host system 220

Schedule a media management operation to be performed between the first expected time period and the second expected time period 230

FIG. 2

SCHEDULING MEDIA MANAGEMENT OPERATIONS BASED ON PROVIDED HOST SYSTEM USAGE REQUIREMENTS

TECHNICAL FIELD

Embodiments of the disclosure relate generally to memory sub-systems, and more specifically, relate to scheduling media management operations based on provided host system usage requirements.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a flow diagram of an example method to schedule a media management operation based on provided host system usage requirements in accordance with some embodiments of the present disclosure.

DETAILED DESCRIPTION

Figure 1:
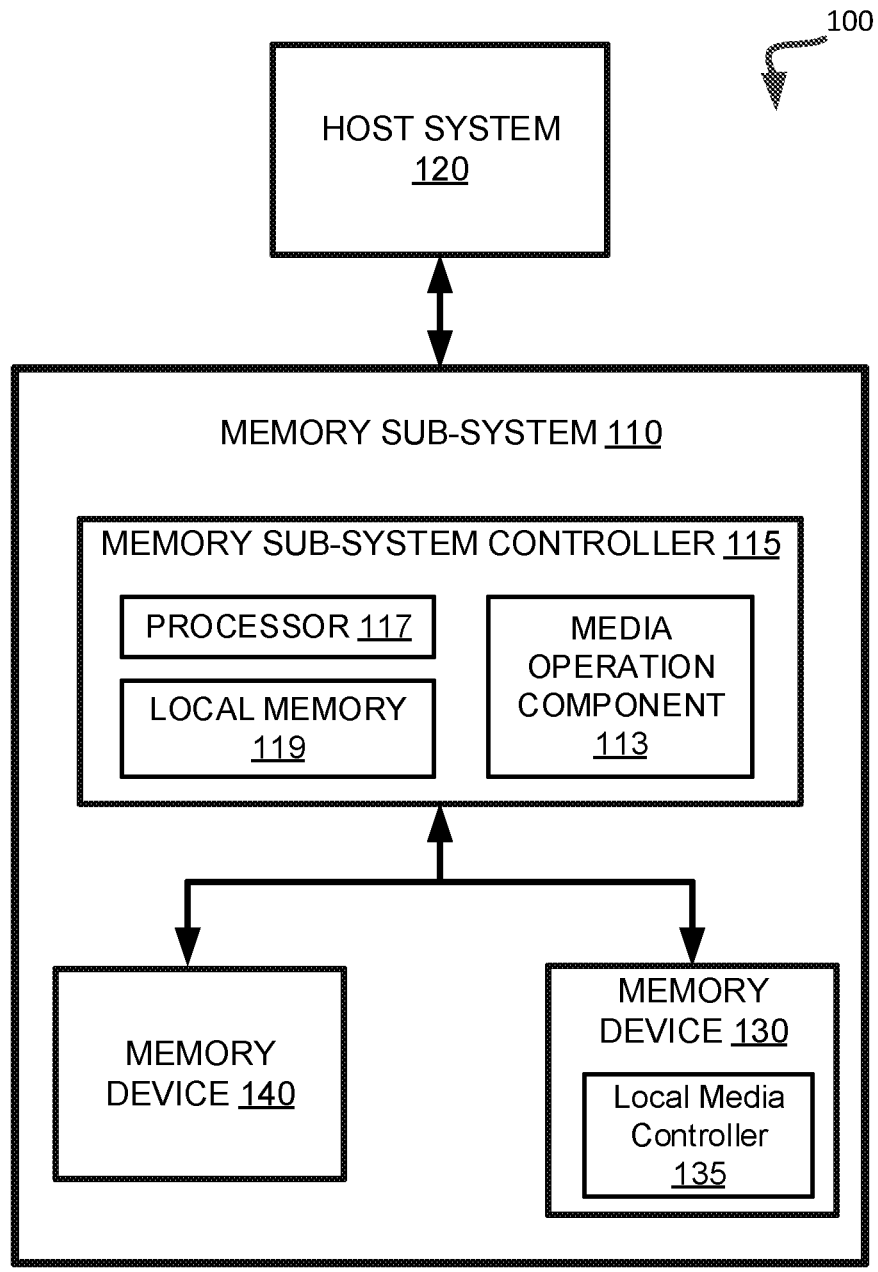
FIG. 1 illustrates an example computing environment that includes a memory sub-system in accordance with some embodiments of the present disclosure.

Aspects of the present disclosure are directed to scheduling media management operations based on provided host system usage requirements. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as "memory devices" that store data. The host system can provide data to be stored at the memory sub-system and can request data to be retrieved from the memory sub-system.

A memory device can be a non-volatile memory device. A non-volatile memory device is a package of one or more dies. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area that can be erased and pages within the blocks cannot be erased individually. For such devices, erase operations are performed one block at a time.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data".

A page can contain valid data, invalid data, or no data. Invalid data is data that is marked as outdated as a new version of the data is stored on the memory device. Valid data is the most recent version of such data being stored on the memory device. A memory sub-system can mark data as invalid based on information received, for example, from an operating system.

A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and reused for write operations. Garbage collection is a set of operations that include, for example, selecting a block that contains valid and invalid data, selecting pages in the block that contain valid data, copying the valid data to new locations (e.g., free pages in another block), marking the data in the previously selected pages as invalid, and erasing the selected block.

The storing of data at a memory device can increase the wear of the memory device. After a threshold amount of write operations, the wear can cause the memory device to become unreliable so that data can no longer be reliably stored and retrieved from the memory device. At such a point, the memory sub-system can result in a failure when any of the memory devices fails. Wear leveling is a process that helps reduce premature wear in memory devices by distributing write operations across the memory devices. Wear leveling includes a set of operations to determine which physical media (e.g., set of memory cells) to use each time data is programmed to help ensure that certain physical sets of memory cells are not written and erased more often than others.

A memory sub-system can perform various operations with respect to one or more memory components included in the memory sub-system. The operations can be host-initiated operations. For example, a memory sub-system can receive host access requests that initiate, for example, read operations, write operations, and erase operations, to be performed by the memory sub-system to respectively read, write, and erase host data at the memory sub-system. In another example, the operations can be initiated by the memory sub-system, for example, to perform media management operations, such as garbage collection operations, data refresh operations, and wear leveling operations at one or more memory components to manage data stored on the media (e.g., memory devices) at the memory sub-system. The media management operations can be performed as background operations. The media management operations can be initiated, for example, by a memory sub-system controller that is described in greater detail below in conjunction with FIG. 1. The media management operations can include read operations, write operations, and erase operations initiated by the memory sub-system.

In some memory sub-system applications, the host system can transmit one or more requests to perform an operation, such as a write operation to store host data at the memory sub-system, for a first time period (referred to as a data bust time period). A memory sub-system controller can perform one or more operations at the memory sub-system during the data burst time period in response to the one or more requests. For a second time period (referred to as an idle time period), the host system does not transmit any requests to perform operations. As such, the memory sub-system controller does not perform any host-initiated operations at the memory sub-system during the idle time period. The data burst time period can occur at a set frequency during the operation of the host system. For example, a first data burst time period can occur at time 0 milliseconds (mS). Each subsequent data burst time period can occur every 250 mS following the first data burst time period, during the operation of the host system.

The idle time period can occur in between data burst time periods. For example, a first data burst time period can occur at time 0 mS and can last for approximately 150 mS. A second data burst time period can occur at 250 mS. An idle time period can begin at 151 mS and can end at 249 mS. The memory sub-system controller can perform a media management operation during the idle time period and can suspend the media management operation during subsequent data burst time periods. The media management operation can be, for example, a garbage collection operation that selects blocks that have valid and invalid data. The valid data from the selected blocks can be copied to other locations (e.g., free pages in other block(s)), and the selected blocks can be erased so that, during subsequent data burst time periods, incoming host data can be written to the selected blocks.

In conventional memory sub-systems, the garbage collection operation does not make enough blocks available for incoming host data during subsequent data burst time periods. In some conventional memory sub-systems, an idle time period between data burst time periods are is not long enough for the garbage collection operation to make enough blocks available for incoming host data. Incoming host data can be stored in a buffer space at the memory sub-system. Once enough space (e.g., blocks) is made available on the memory devices of the memory sub-system, the memory sub-system controller can move host data from the buffer space to the available blocks. If, however, the buffer space does not include capacity to store additional incoming host data, the additional incoming host data will not be stored at the memory sub-system and will be dropped.

Aspects of the present disclosure address the above and other deficiencies by having a memory sub-system that can schedule a media management operation based on usage parameter values provided from the host system to the memory sub-system controller. A usage parameter can include a data burst rate, an amount of data write idle time, an average host system usage time, a maximum host system usage time, or other parameters. Based on the usage parameter values, the memory sub-system controller can determine a first expected time period and a second expected time period, where incoming host data is expected to be received during each expected time period. Based on the expected time periods, the memory sub-system controller can schedule a media management operation. For example, the memory sub-system controller can schedule the media management operation to be performed between the first expected time period and the second expected time period.

In some implementations, the memory sub-system controller can determine a rate at which incoming host data is to be written at the memory sub-system based on the usage parameter values. Based on the rate at which the host data is to be written, the memory sub-system controller can determine an idle time period, where incoming host data is not expected to be received at the memory sub-system. The memory sub-system controller can schedule the media management operation to be performed during the idle time period.

Advantages of the present disclosure include, but are not limited to increased media management operation performance, such as garbage collection performance. By scheduling the media management operation based on the usage parameter values, the memory sub-system controller can allot an appropriate amount of time for the media management operation to ensure enough blocks are available for incoming host data received at the memory sub-system. Aspects of the present disclosure will further increase the performance (i.e., reduced latency) of the memory sub-system and reduce the amount of incoming host data that is not stored at the memory sub-system.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells such as single level cells (SLCs), multi-level cells (MLCs), triple level cells (TLCs), or quad-level cells (QLCs). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc.

The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 cannot include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. In some embodiments, the memory devices 130 are managed memory devices, which is a raw memory device combined with a local controller (e.g., the local media controller 135) for memory management within the same memory device package.

The memory sub-system 110 includes a media operation component 113 that can schedule a media management operation based on provided host system usage requirements. In some embodiments, the memory sub-system controller 115 includes at least a portion of the media operation component 113. For example, the memory sub-system controller 115 can include a processor 117 (processing device) configured to execute instructions stored in local memory 119 for performing the operations described herein. In some embodiments, the media operation component 113 is part of the host system 110, an application, or an operating system.

In some implementations of the present disclosure, the media operation component 113 can receive the one or more usage parameter values from the host system. A usage parameter value can include at least one of a data burst rate, an amount of data write idle time, an average host system usage time, a maximum host system usage time, or other parameters. A data burst rate can indicate an amount of incoming host data to be received at the memory sub-system 110 during a fixed period of time (e.g., 100 MB/s). An amount of data write idle time can indicate an amount of time incoming host data is not to be received at the memory sub-system 110 (i.e., a period of time between two data burst time periods). An average host system usage time can indicate an average amount of time the host system operates in accordance with an application of the host system. A maximum host system usage time can indicate a maximum amount of time the host system can operate in accordance with an application of the host system. For example, the host system can be used as part of a video surveillance system. The average usage time of the video surveillance system can be approximately 12 hours while the maximum usage time can be approximately 24 hours.

Based on the one or more usage parameter values received from the host system, the memory sub-system controller 115 can determine a first expected time period and a second expected time period, where incoming host data is expected to be received at the memory sub-system 110 during each expected time period. The memory sub-system controller 115 can schedule a media management operation setting based on the first expected time period and the second expected time period. For example, the memory sub-system controller 115 can schedule a media management operation, such as a garbage collection operation, to be performed between the first expected time period and the second expected time period.

In alternative or similar embodiments, the memory sub-system controller 115 can determine a rate at which data is to be written at the memory sub-system based on the usage parameter values. The memory sub-system controller 115 can schedule the media management operation based on the rate at which data is to be written at the memory sub-system. Further details with regards to the operations of the media operation component 113 are described below.

FIG. 2 is a flow diagram of an example method 200 to schedule a media management operation based on provided host system usage requirements in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the media operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device receives, from a host system, one or more usage parameter values, where the one or more usage parameter values correspond to one or more operations performed at a memory sub-system. As discussed above, the one or more usage parameter values can include at least one of a data burst rate, an amount of data write idle time, an average host system usage time, or a maximum host system usage time. In some embodiments, the processing device can receive the one or more usage parameter values from the host system in response to an initial configuration of the host system. In other or similar embodiments, the processing device can receive the one or more usage parameter values in response to a subsequent reconfiguration of the host system (e.g., the host system is reset to factory settings, etc.).

At operation 220, the processing device determines, based on the one or more received usage parameter values, a first expected time period when a first set of host data will be received from the host system, and a second expected time period when a second set of host data will be received from the host system. In one example, the processing device can receive the data burst rate for incoming host data as a parameter value from the host system. Based on the data burst rate, the processing device can determine the amount of time expected, during each data burst time period, to write received incoming host data (e.g., 100 mS). Based on the amount of time expected, the processing device can determine the first expected time period where the first set of host data will be received at time 0 mS and end at time 100 mS. The processing device can also determine that the second expected time period where the second set of host data will be received at time 250 mS and end at time 350 mS.

Based on the first expected time period and the second expected time period, an expected idle time period can also be determined. In accordance with the above described example, the processing device can determine that the expected idle time period is to begin at time 101 mS and end at time 249 mS. At operation 230, the processing device schedules a media management operation to be performed between the first expected time period and the second expected time period. As discussed above, the processing device can determine, based on the first expected time period and the second expected time period, an idle time period where host data is not expected to be received from the host system. The processing device can schedule the media management operation to be performed after the first set of host data is received at the first expected time period (i.e., during the idle time period) and stored at the memory subsystem.

In some embodiments, the processing device can receive an indication that a first set of host data has been stored at the memory sub-system. In response to receiving the indication, the processing device can perform the scheduled media management operation at a first portion of memory devices of the memory sub-system. In some embodiments, the first portion of memory devices can include one or more blocks. In other or similar embodiments, the first portion of memory devices can include one or more pages. In other or similar embodiments, the first portion of memory devices can include one or more management units. The processing device can determine whether a second set of host data will be received from the host system at the second expected time. In some embodiments, the processing device can determine whether the second set of host data will be received from the host system by transmitting a request to the host system inquiring whether the host system is to transmit the second set of subsequent host data at the second expected time period. In response to receiving a response from the host system indicating that the second set of host data will not be transmitted at the second expected time period, the scheduled media management operation can be performed at a second portion of memory devices of the memory sub-system. The second portion of memory devices can include one or more blocks, one or more pages, or one or more management units, in accordance with previously described embodiments. In response to receiving a response from the host system indicating that the second set of host data will be received at the second expected time period, the memory sub-system can receive the second set of host data from the host system at the expected time period. The processing device can store the second set of host data at the memory subsystem. The processing device can perform the scheduled media management operation at the second portion of memory devices of the memory sub-system.

In some embodiments, the processing device can further determine, based on the one or more received usage parameter values, a portion of memory devices at the memory sub-system to be reserved as a buffer space. As described in previous embodiments, the portion of memory devices can include one or more blocks, one or more pages, or one or more management units. The buffer space can store host data received from the host system while the scheduled media management operation is being performed. In response to determining the portion of memory devices to be reserved as buffer space, the processing device can reserve the determined portion of memory devices at the memory sub-system.

In one example, the processing device can receive the average host system usage time as a parameter value from the host system. Based on the scheduled media management operation and the received average host system usage time, the processing device can determine an amount of buffer space to be available to store incoming host data during each idle time period so to facilitate storage of incoming host data during the average host system usage time. The processing device can reserve the portion of memory devices, corresponding to the determined amount of buffer space, as buffer space at the memory sub-system.

In another example, the processing device can receive the maximum host system usage time as a parameter value from the host system. Based on the scheduled media management operation and the received maximum host system usage time, the processing device can determine an amount of buffer space to be available to store incoming host data during each idle time period so to facilitate storage of incoming data during the maximum host system usage time. In some embodiments, the amount of buffer space to be available for incoming data during the maximum host system usage time can be larger than the amount of buffer space to be available for incoming data during the average host system usage time. The processing device can reserve a portion of memory devices, corresponding to the determined amount of buffer space, as buffer space at the memory sub-system.

In some embodiments, one or more usage parameter values can be determined by the processing device based on one or more write operations performed at the memory sub-system. The processing device can receive host data to be written at the memory sub-system from the host system. The processing device can perform a write operation to write the host data at the memory sub-system. Based on the performance of the write operation, the processing device can determine one or more usage parameter values. In some embodiments, the processing device can determine one or more usage parameter values after receiving one or more usage parameter values from the host system. For example, the host system can provide a data burst rate and an amount of data write idle time to the processing device, in accordance with previously described examples. As one or more sets of host data are received to be written at the memory sub-system, the processing device can determine, during the performance of the write operations to write the host data to the memory sub-system, one or more usage parameter values, such as an average host system usage time and/or a maximum host system usage time. Based on the determined usage parameter values, the processing device can determine another first expected time period and another second expected time period, in accordance with previously described embodiments. Another media management operation can be scheduled, in accordance with previously described embodiments.

Figure 3:
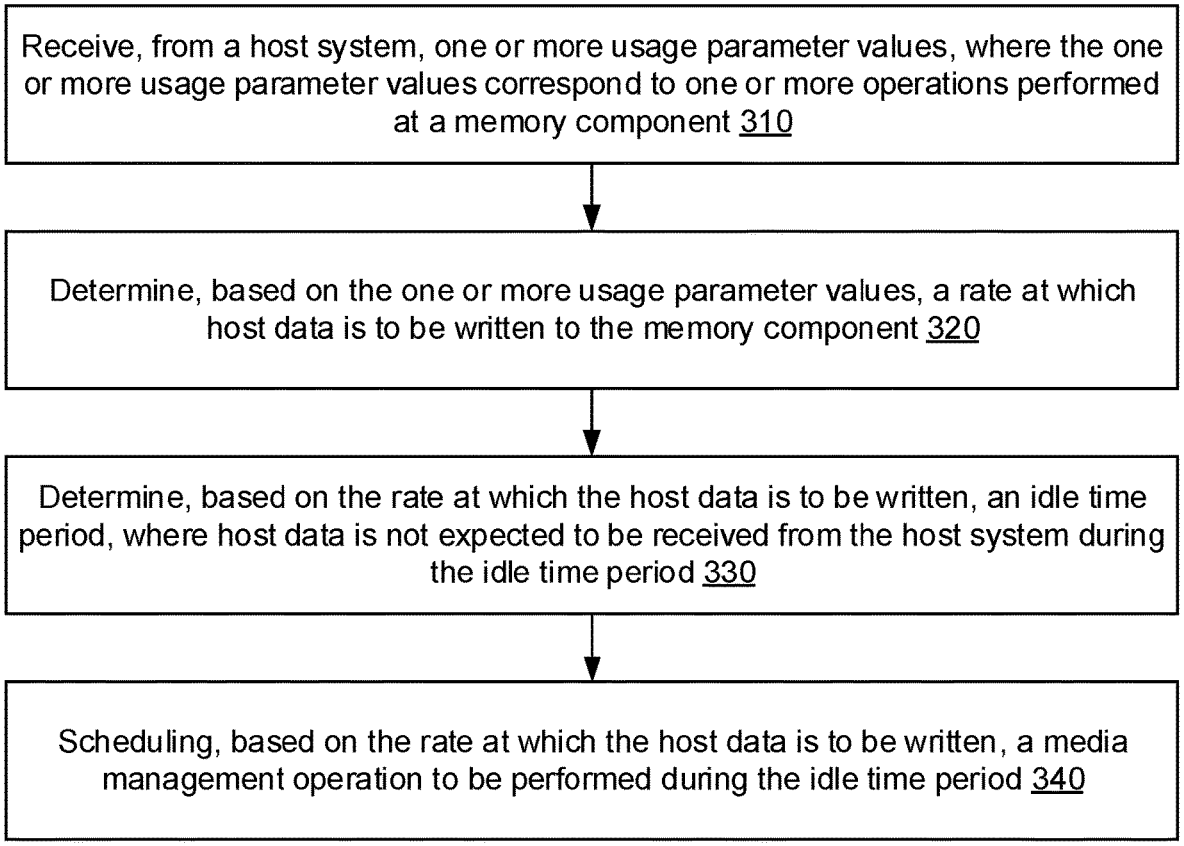
FIG. 3 is a flow diagram of another example method to schedule a media management operation based on provided host system usage requirements in accordance with some embodiments of the present disclosure.

FIG. 3 is a flow diagram of another example method 300 to schedule a media management operation based on provided host system usage requirements in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the media operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device receives, from a host system, one or more usage parameter values, where the one or more usage parameter values correspond to one or more operations performed at a memory component. At operation 320, the processing device determines, based on the one or more received usage parameter values, a rate at which host data is to be written to the memory component. In one example, the processing device can receive a burst rate for incoming host data as a usage parameter value from the host system. Based on the received burst rate, the processing device can determine a rate at which incoming host data is to be written to the memory component. The processing device can determine the rate based on a target amount of time to reserve for a media management operation such to allow for enough space of the memory devices to be made available for each time period in which incoming host data is received (i.e., data burst time period).

At operation 330, the processing device determines, based on the rate at which the host data is to be written, an idle time period, where host data is not expected to be received from the host system during the idle time period. In accordance with the previously described example, the processing device can determine an idle time period based on the target amount of time to reserve for the media management operation At operation 340, the processing device schedules, based on the rate at which the host data is to be written, a media management operation to be performed during the idle time period.

In some embodiments, the idle time period can be a first idle time period during an operation of the host system. In such embodiments, responsive to receiving an indication that a first set of host data has been written at the memory component, the processing device can perform the scheduled media management operation at a first portion of memory devices of the memory component for the idle time period. The processing device can determine whether a second set of host data will be received from the host system after the idle time period has expired. In response to determining that the second set of host data will not be received after the idle time period has expired, the processing device can perform the scheduled media management operation at a second portion of memory devices at the memory component. In response to determining that the second set of host data will be received after the idle time period has expired, the memory component can receive the second set of host data from the host system after the idle time period has expired. The second set of host data can be stored at the memory component. The processing device can perform the scheduled media management operation at a second portion of memory devices of the memory component for a second idle time period.

In some embodiments, the processing device can further determine, based on the one or more usage parameter values, a portion of memory units at the memory component to be reserved as a buffer space. The buffer space can store host data received from the host system while the scheduled media management operation is being performed. In response to determining the portion of memory devices to be reserved as buffer space, the processing device can reserve the determined portion of memory devices at the memory component.

The one or more usage parameter values can be determined by the processing device, in accordance with previously described embodiments. In some embodiments, in response to determining the one or more usage parameter values, the processing device can determine another rate at which incoming host data is to be written to the memory component. Another media management operation can be scheduled, in accordance with previously described embodiments.

Figure 4A:
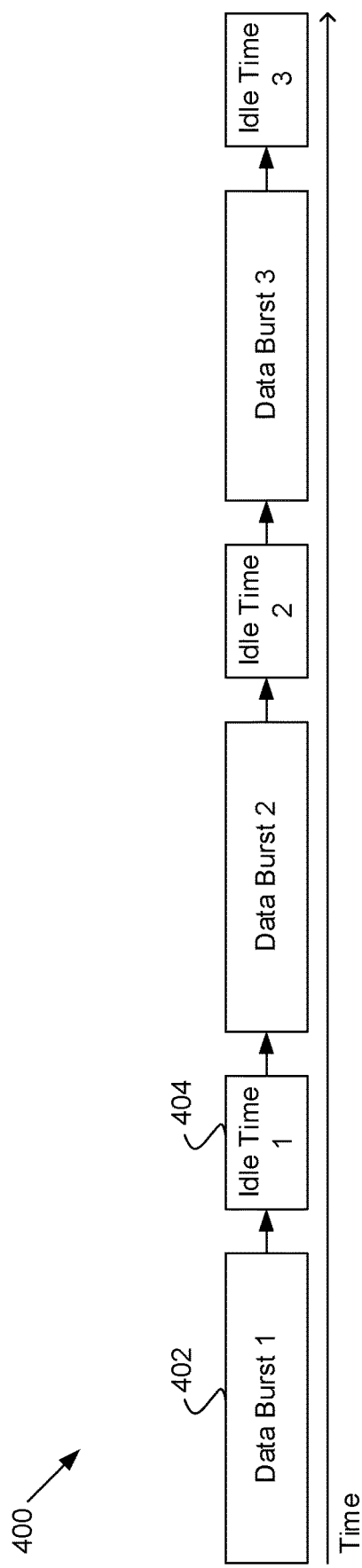
FIGS. 4A and 4B illustrate scheduling a media management operation based on provided host system usage requirements in accordance with some embodiments of the present disclosure.
Figure 4B:
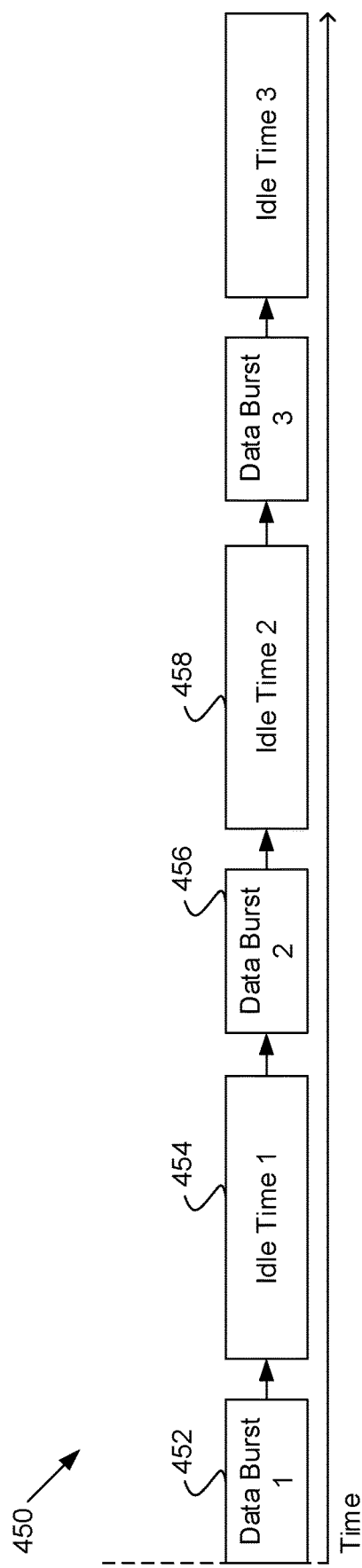

FIGS. 4A and 4B illustrate scheduling a media management operation based on host system usage requirements in accordance with some embodiments of the present disclosure. A host system timeline 400 can indicate one or more time periods at which requests to write host data to the memory sub-system are received. Host system timeline 400 can include data burst time periods (i.e., a first data burst time period 402 and a second data burst time period 404) and idle time periods (i.e., idle time period 406). The memory sub-system can receive incoming host data to be written to the memory sub-system during data burst time periods 402, 404. The memory sub-system does not receive incoming host data during idle time periods 406 while one or more media management operations can be performed.

In some embodiments, the processing device can receive one or more usage parameter values, from the host system, that correspond to one or more operations performed at the memory sub-system. As discussed above, the one or more usage parameter values can include at least one of a data burst rate, an amount of data write idle time, an average host system usage time, or a maximum host system usage time. Based on the one or more usage parameter values, the processing device can determine a first expected time period and a second expected time period, where host data is expected to be received from the host system during each expected time period. The processing device can determine the first expected time period and the second expected time period in accordance with previously described embodiments. In other or similar embodiments, the processing device can determine a rate at which data is to be written at the host system based on the one or more usage parameter values, in accordance with previously described embodiments.

As illustrated in FIG. 4B, adjusted host timeline 450 is a host timeline based on the determined first expected time period (i.e., a first data burst time period 452) and second expected time period (i.e., a second data burst time period 454) and/or the rate at which data is to be written at the host system. The processing device can determine a first idle time period 456 based on either the first data burst time period 420 and the second data burst time period 454, or the rate at which host data is to be written at the host system, in accordance with previously described embodiments.

In response to determining the first idle time period 456, the processing device can schedule a media management operation to be performed at the memory sub-system. As previously described, the processing device can schedule the media management operation to be performed during first idle time period 456. As described previously, the processing device can expect a first set of host data to be received at first data burst time period 452 and a second set of host data to be received at second data burst time period 454. In response to receiving the indication, the processing device can perform the scheduled media management operation during first idle time period 456. The processing device can determine whether the second set of host data is to be received at second data burst time period 454. In response to determining that the second set of host data is to be received at second data burst time period 454, the processing device can suspend the scheduled media management operation while the second set of host data is received and written at the memory sub-system. In response to determining that the second set of host data is not to be received at the second data burst time period, the processing device can perform the scheduled media management operation during a second idle time period 658.

Figure 5:
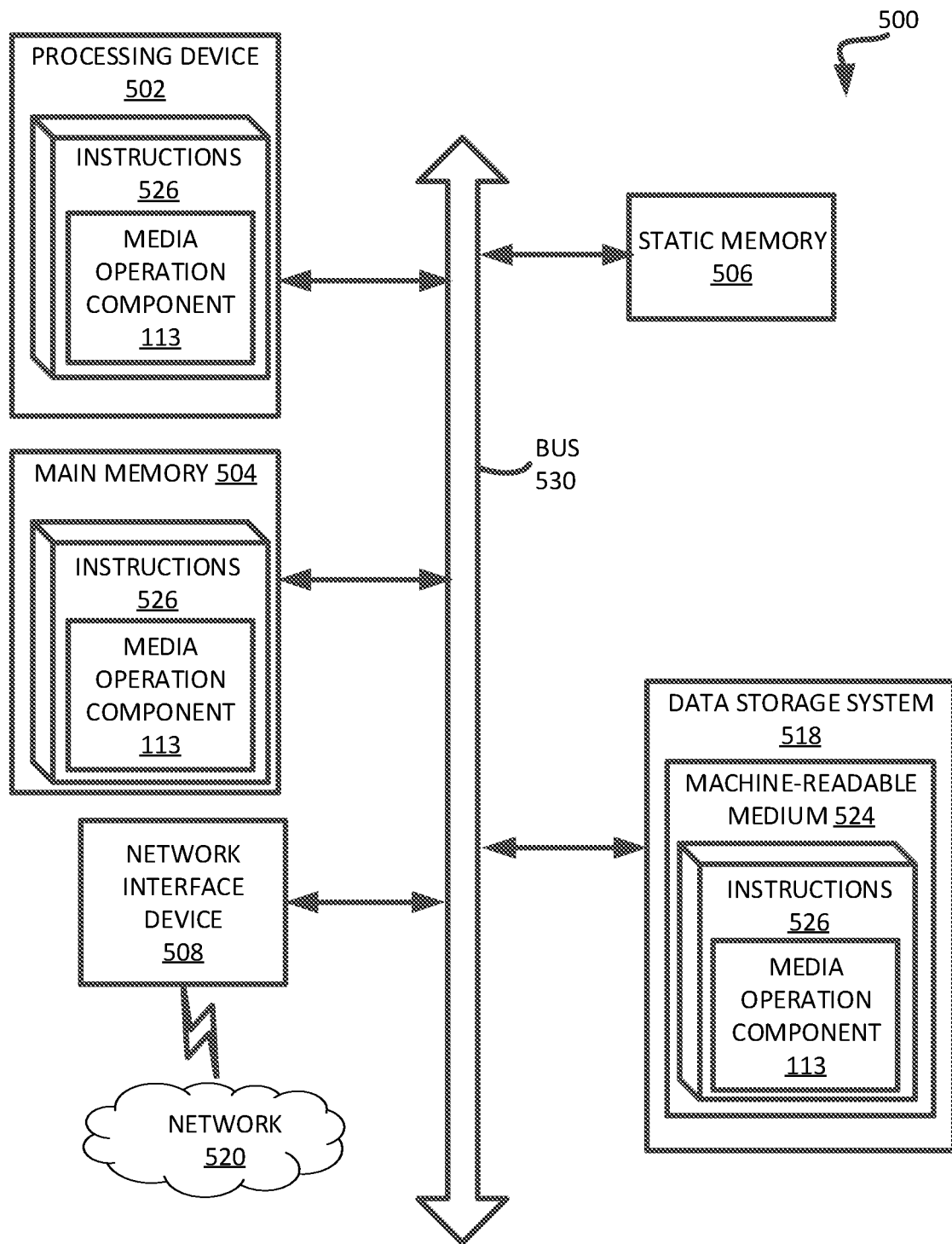
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a media operation component (e.g., the media operation component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a memory sub-system controller, one or more usage parameter values from a host system, wherein the one or more usage parameter values correspond to one or more operations performed at a memory sub-system;
   determining, by the memory sub-system controller and based on the one or more usage parameter values, a first expected time period during which a first set of host data will be received from the host system and a second expected time period during which a second set of host data will be received from the host system;
   scheduling, by the memory sub-system controller, a media management operation to be performed at the memory sub-system between the first expected time period and the second expected time period;
   performing, by the memory sub-system controller, the scheduled media management operation at a first portion of memory units of the memory sub-system after the first expected time period; and
   responsive to determining, in view of an indication received from the host system, that the second set of host data will not be received at the second expected time period, performing, by the memory sub-system controller, the media management operation at a second portion of memory units of the memory sub-system.

2. The method of claim 1, wherein the scheduled media management operation is performed at the first portion of memory units of the memory sub-system responsive to receiving an indication that the first set of host data has been stored at the memory sub-system.

3. The method of claim 2, further comprising:
responsive to determining that the second set of host data will be received at the second expected time period, receiving, from the host system, the second set of host data at the second expected time period;
storing the second set of host data at the memory sub-system; and
performing the media management operation at the second portion of memory units of the memory sub-system.

4. The method of claim 1, further comprising:
transmitting a request, to the host system, inquiring whether the host system is to transmit the second set of host data at the second expected time period; and
receiving a response, from the host system, comprising the indication of whether the second set of host data will be transmitted from the host system at the second expected time period.

5. The method of claim 1, wherein scheduling the media management operation to be performed comprises:
determining, based on the first expected time period and the second expected time period, an idle time period, wherein host data is not expected to be received from the host system during the idle time period; and
determining that the media management operation is to be performed after the first set of host data is received at the first expected time period and during the idle time period.

6. The method of claim 1, further comprising:
determining, based on the one or more usage parameter values, a portion of memory units at the memory sub-system to be reserved as a buffer space, wherein the buffer space is to store host data received from the host system while the scheduled media management operation is being performed; and
reserving the determined portion of memory units at the memory sub-system.

7. The method of claim 1, wherein the one or more usage parameter values comprise at least one of a data burst rate, an amount of data write idle time, an average host system usage time, or a maximum host system usage time.

8. A system comprising:
a memory component; and
a processing device, operatively coupled with the memory component to:
receive, by a memory sub-system controller, one or more usage parameter values from a host system, wherein the one or more usage parameter values correspond to one or more operations performed at the memory component;
determine, by the memory sub-system controller and based on the one or more usage parameter values, a rate at which host data is to be written to the memory component;
determine, by the memory sub-system controller and based on the rate at which the host data is to be written, an idle time period, wherein host data is not expected to be received from the host system during the idle time period;
schedule, by the memory sub-system controller and based on the rate at which the host data is to be written, a media management operation to be performed at the memory component during the idle time period;
perform, by the memory sub-system controller, the media management operation at a first portion of memory units of the memory component for the idle time period; and
responsive to determining, in view of an indication received from the host system, that a second set of host data will not be received after the idle time period has expired, performing, by the memory sub-system controller, the media management operation at a second portion of memory units at the memory component.

9. The system of claim 8, wherein the processing device is to perform the scheduled media management operation at the first portion of memory units of the memory component responsive to receiving an indication that a first set of host data has been stored at the memory component.

10. The system of claim 9, wherein the processing device is further to:
responsive to determining that the second set of host data will be received after the idle time period has expired, receive, from the host system, the second set of host data after the idle time period has expired;
storing the second set of host data at the memory component; and
performing the media management operation at a second portion of memory units of the memory component for an additional idle time period.

11. The system of claim 8, wherein the processing device is further to:
inquire, from the host system, whether the host system is to transmit the second set of host data after the idle time period has expired and
receive, from the host system, the indication of whether the second set of host data will be transmitted from the host system after the idle time period has expired in response to the inquiry.

12. The system of claim 8, wherein the processing device is further to:
determine, based on the one or more usage parameter values, a portion of memory units at the memory component to be reserved as a buffer space, wherein the buffer space is to store host data received from the host system while the scheduled media management operation is being performed; and
reserve the determined portion of memory units at the memory component.

13. The system of claim 8, wherein the one or more usage parameter values comprise at least one of a data burst rate, an amount of data write idle time, an average host system usage time, or a maximum host system usage time.

14. A non-transitory computer readable medium comprising instructions, which when executed by a processing device, to:
receive, by a memory sub-system controller, one or more usage parameter values from a host system, wherein the one or more usage parameter values correspond to one or more operations performed at a memory sub-system;
determine, by the memory sub-system controller and based on the one or more usage parameter values, a first expected time period when a first set of host data will be received from the host system and a second expected time period when a second set of host data will be received from the host system;

schedule, by a memory sub-system controller, a media management operation to be performed at the memory sub-system between the first expected time period and the second expected time period;

perform, by the memory sub-system controller, the scheduled media management operation at a first portion of memory units of the memory sub-system after the first expected time period; and responsive to determining, in view of an indication received from the host system, that the second set of host data will not be received at the second expected time period, perform, by the memory sub-system controller, the media management operation at a second portion of memory units of the memory sub-system.

15. The non-transitory computer readable medium of claim 14, wherein the processing device is to perform the scheduled media management operation at the first portion of memory units of the memory sub-system responsive to receiving an indication that the first set of host data has been stored at the memory sub-system.

16. The non-transitory computer readable medium of claim 15, wherein the processing device is further to:

responsive to determining that the second set of host data will be received at the second expected time period, receive, from the host system, the second set of host data at the second expected time period;

store the second set of host data at the memory sub-system; and perform the media management operation at the second portion of memory units of the memory sub-system.

17. The non-transitory computer readable medium of claim 14, wherein the processing device is further to:

transmit a request, to the host system, inquiring whether the host system is to transmit the second set of host data at the second expected time period; and receive a response, from the host system, indicating comprising the indication of whether the second set of host data will be transmitted from the host system at the second expected time period.

18. The non-transitory computer readable medium of claim 14, wherein to schedule the media management operation, the processing device is to:

determine, based on the first expected time period and the second expected time period, an idle time period, wherein host data is not expected to be received from the host system during the idle time period; and determining that the media management operation is to be performed after the first set of host data is received at the first expected time period and during the idle time period.

19. The non-transitory computer readable medium of claim 14, wherein the processing device is further to:

determine, based on the one or more usage parameter values, a portion of memory units at the memory sub-system to be reserved as a buffer space, wherein the buffer space is to store host data received from the host system while the scheduled media management operation is being performed; and reserve the determined portion of memory units at the memory sub-system.

20. The non-transitory computer readable medium of claim 14, wherein the one or more usage parameter values comprise at least one of a data burst rate, an amount of data write idle time, an average host system usage time, or a maximum host system usage time.

* * * * *